(12) United States Patent
Lee et al.

(10) Patent No.: US 8,129,723 B2
(45) Date of Patent: Mar. 6, 2012

(54) LIQUID CRYSTAL DISPLAY AND PANEL THEREFOR

(75) Inventors: Baek-Woon Lee, Gyeonggi-do (KR); Keun-Kyu Song, Gyeonggi-do (KR); Joon-Hak Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 46 days.

(21) Appl. No.: 12/146,110

(22) Filed: Jun. 25, 2008

(65) Prior Publication Data

US 2008/0258149 A1   Oct. 23, 2008

Related U.S. Application Data

(63) Continuation of application No. 11/285,464, filed on Nov. 22, 2005, now Pat. No. 7,405,427.

(30) Foreign Application Priority Data

Dec. 24, 2004 (KR) .......................... 10-2004-0112256

(51) Int. Cl.
*H01L 27/14* (2006.01)
(52) U.S. Cl. .............................. 257/72; 257/59; 257/292
(58) Field of Classification Search .................... 257/59, 257/72
See application file for complete search history.

(56) References Cited

U.S. PATENT DOCUMENTS

| | | | | |
|---|---|---|---|---|
| 5,668,379 A * | 9/1997 | Ono et al. ........................ 257/59 |
| 6,400,440 B1 * | 6/2002 | Colgan et al. .................. 349/160 |
| 6,449,025 B2 * | 9/2002 | Lee ................................ 349/129 |
| 6,583,471 B1 | 6/2003 | Yamazaki et al. |
| 6,818,921 B2 * | 11/2004 | Yasukawa ........................ 257/59 |
| 7,136,122 B2 * | 11/2006 | Tak ................................ 349/110 |
| 7,385,661 B2 * | 6/2008 | Chae ............................. 349/141 |
| 2004/0125277 A1 * | 7/2004 | Kim et al. ..................... 349/106 |
| 2004/0135147 A1 * | 7/2004 | Kim et al. ........................ 257/59 |
| 2004/0263722 A1 * | 12/2004 | Oh et al. ....................... 349/106 |
| 2005/0110924 A1 * | 5/2005 | Kim et al. ..................... 349/111 |

FOREIGN PATENT DOCUMENTS

| | | |
|---|---|---|
| CN | 1129035 | 8/1996 |
| CN | 1460880 | 12/2003 |
| JP | 04-318512 | 11/1992 |
| JP | 07-098462 | 4/1995 |
| JP | 09-269509 | 10/1997 |
| JP | 10-039336 | 2/1998 |
| JP | 10-186407 | 7/1998 |
| JP | 2000089240 | 3/2000 |
| JP | 2001-281682 | 10/2001 |
| JP | 2002277889 | 9/2002 |
| KR | 1020010106849 | 12/2001 |

\* cited by examiner

*Primary Examiner* — Wai Sing Louie
*Assistant Examiner* — Bilkis Jahan
(74) *Attorney, Agent, or Firm* — F. Chau & Associates, LLC

(57) ABSTRACT

A thin film transistor array panel according to an embodiment of the present invention includes: a gate line; a data line intersecting the gate line; a thin film transistor connected to the gate line and the data line; a pixel electrode connected to the thin film transistor; and a shielding electrode electrically isolated from the data line, covering the data line at least in part, and having an aperture exposing the data line.

14 Claims, 13 Drawing Sheets

LIQUID CRYSTAL DISPLAY AND PANEL THEREFOR

CROSS-REFERENCE TO RELATED APPLICATION

This application is a continuation of U.S. application Ser. No. 11/285,464, filed Nov. 22, 2005 now U.S. Pat. No. 7,405,427, which claims priority to Korean Patent Application No. 10-2004-0112256, filed on Dec. 24, 2004, the disclosures of which are incorporated herein by reference in their entireties.

BACKGROUND OF THE INVENTION (a) Field of the Invention

The present invention relates to a liquid crystal display and a panel therefor.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in the absence of electric field, is popular because of its high contrast ratio and wide reference viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

A panel for an LCD includes several signal lines such as gate lines for transmitting gate signals and data lines for transmitting data signals. The signal lines form coupling capacitances along with other signal lines and field generating electrodes, which distort the signals carried by the data lines along with their own resistances.

SUMMARY OF THE INVENTION

A thin film transistor array panel according to an embodiment of the present invention includes: a gate line; a data line intersecting the gate line; a thin film transistor connected to the gate line and the data line; a pixel electrode connected to the thin film transistor; and a shielding electrode electrically isolated from the data line, covering the data line at least in part, and having an aperture exposing the data line.

The shielding electrode and the pixel electrode may be disposed on the same layer.

The thin film transistor array panel may further include a passivation layer disposed on the gate line, the data line, and the thin film transistor, and the shielding electrode and the pixel electrode may be disposed on the passivation layer. The passivation layer may include organic insulator.

The thin film transistor array panel may further include a storage electrode overlapping the pixel electrode and supplied with the same voltage as the shielding electrode.

The shielding electrode may extend along the data line or the gate line. The shielding electrode may cover edges of the data line and it may overlap the gate line at least in part.

The shielding electrode may extend along the gate line and the data line. The shielding electrode may include a first portion extending along the gate line and narrower than the gate line and a second portion extending along the data line and wider than the data line.

The pixel electrode may have a cutout and may include a first subpixel electrode connected to the thin film transistor and a second subpixel electrode capacitively coupled to the first subpixel electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
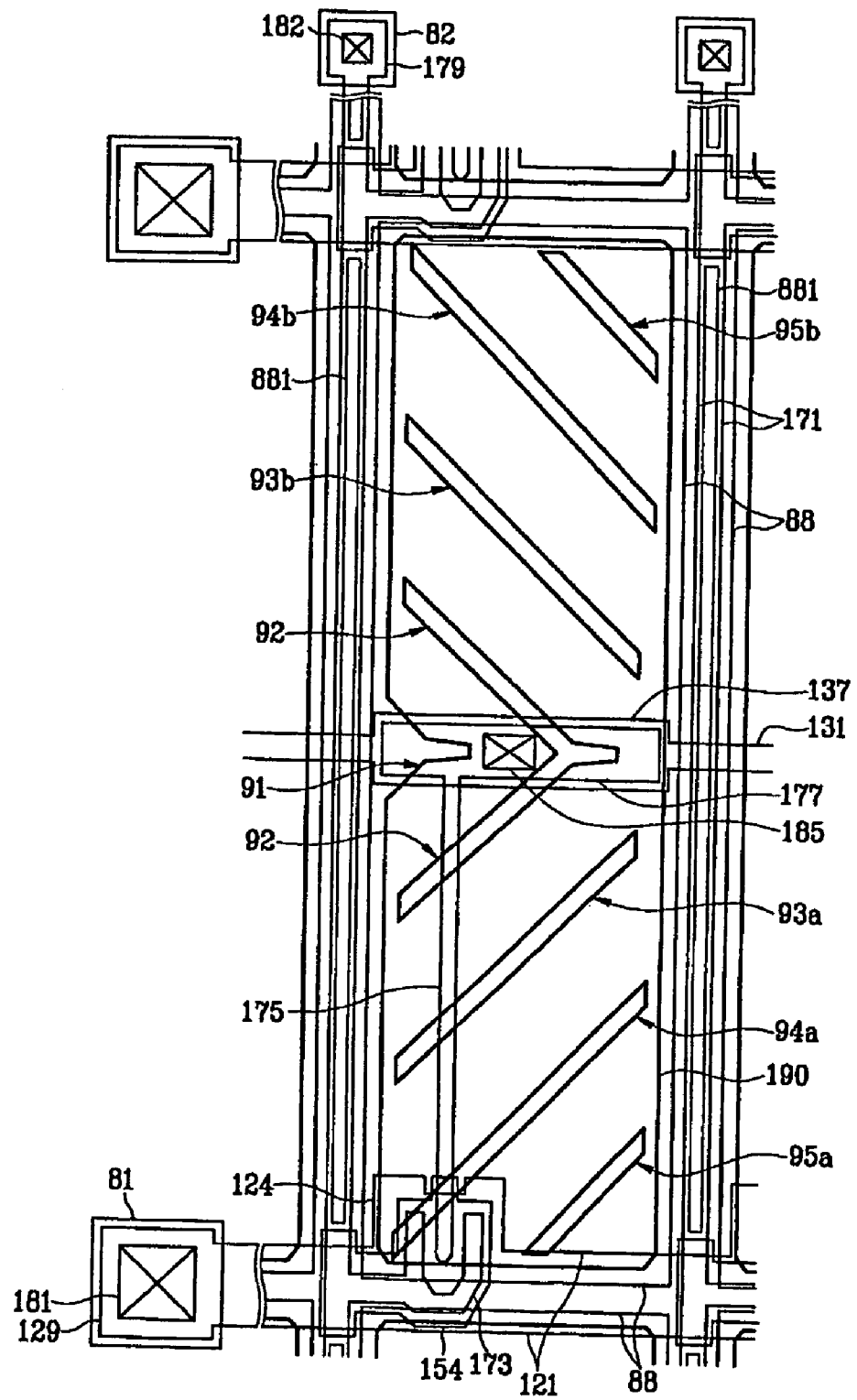
FIG. 1 is a layout view of a TFT array panel of an LCD according to an embodiment of the present invention.

The present invention will now be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1-5.

Figure 2:
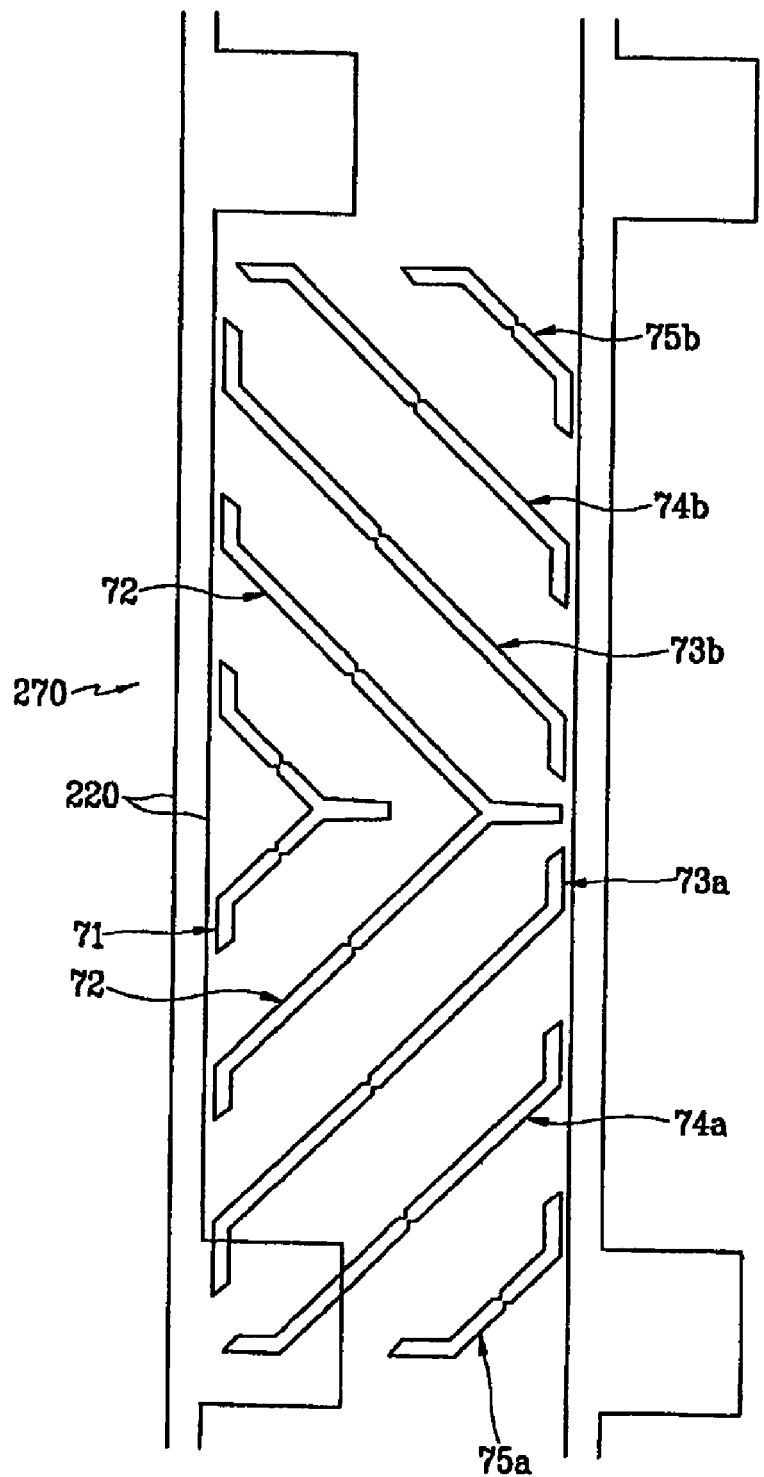
FIG. 2 is a layout view of a common electrode panel of an LCD according to an embodiment of the present invention.
Figure 3:
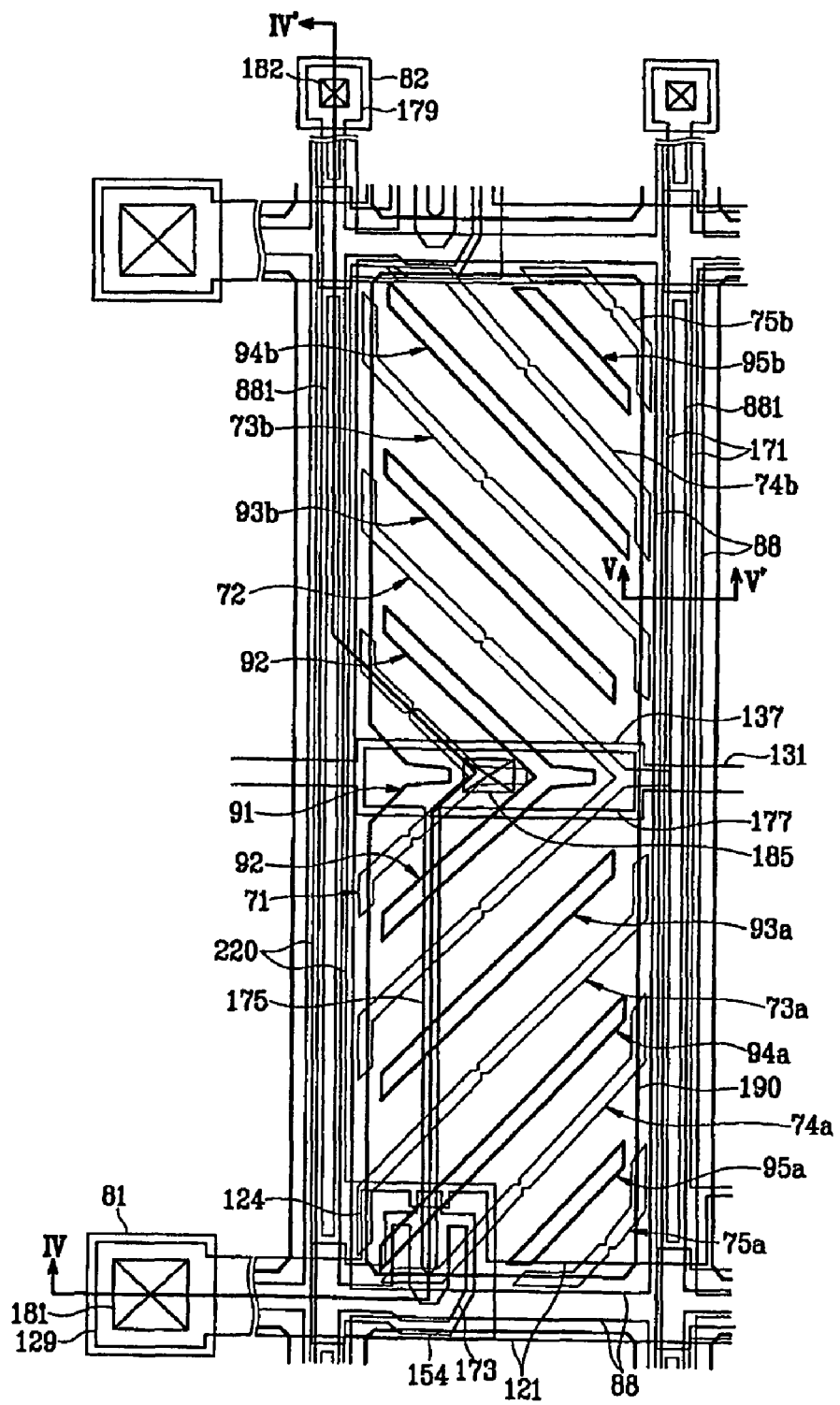
FIG. 3 is a layout view of an LCD including the TFT array panel shown in FIG. 1 and the common electrode panel shown in FIG. 2.
Figure 4:
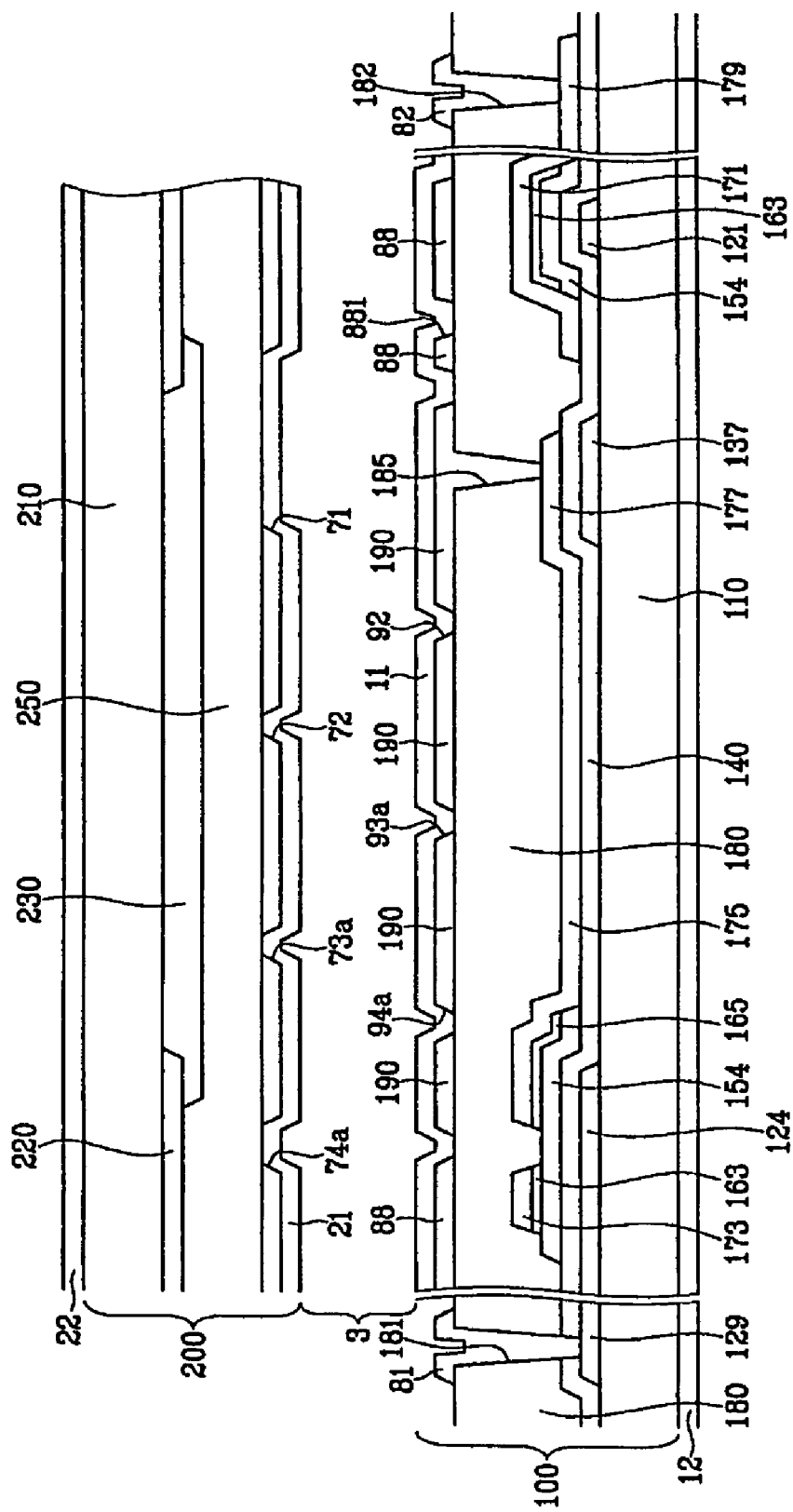
FIGS. 4 and 5 are sectional views of the LCD shown in FIG. 3 taken along lines IV-IV' and V-V', respectively.
Figure 5:
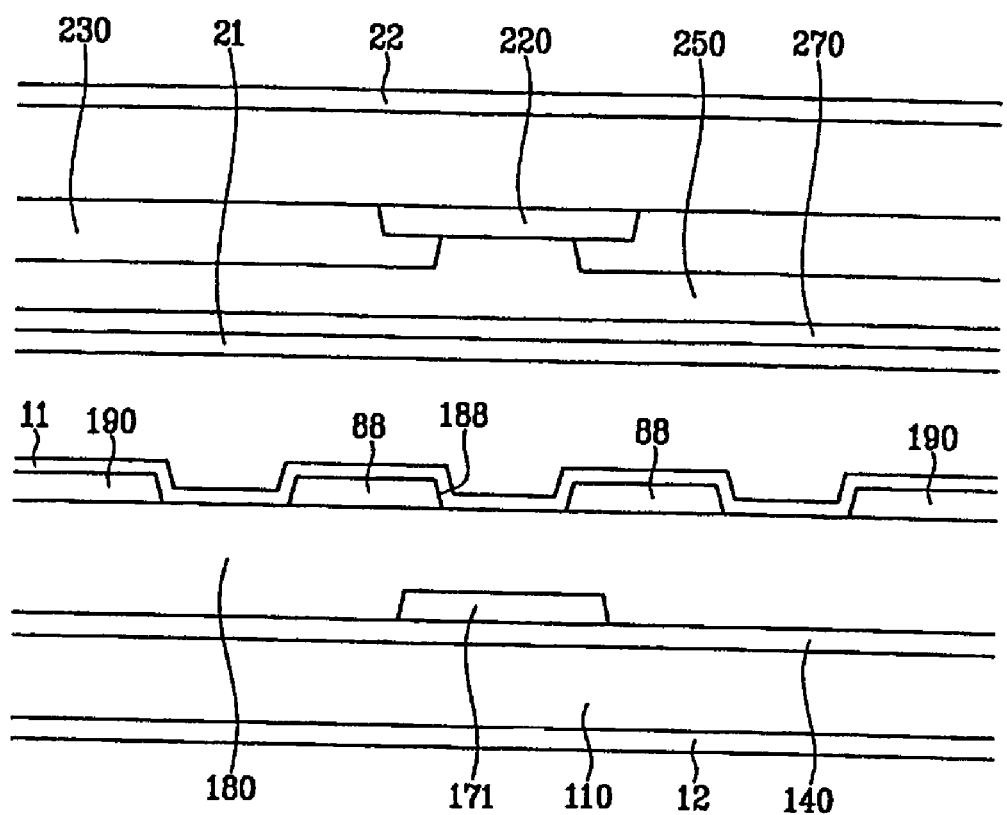

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, and FIGS. 4 and 5 are sectional views of the LCD shown in FIG. 3 taken along lines IV-IV' and V-V', respectively.

An LCD according to an embodiment of the present invention includes a TFT array panel 100, a common electrode panel 200, and a LC layer 3 interposed between the panels 100 and 200.

The TFT array panel 100 is now described in detail with reference FIGS. 1 and 3-5.

A plurality of gate lines 121 and a plurality of storage electrode lines 131 are formed on an insulating substrate 110 such as transparent glass or plastic.

The gate lines 121 transmit gate signals and extend substantially in a transverse direction. Each gate line 121 includes a plurality of gate electrodes 124 projecting upward and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrodes 131 are supplied with a predetermined voltage and extend substantially parallel to the gate lines 121. Each of the storage electrode lines 131 is disposed between two adjacent gate lines 121 and it is nearly equidistant from the two gate lines 121. Each of the storage electrode lines 131 includes a storage electrode 137 expanding upward and downward. However, the storage electrode lines 131 may have various shapes and arrangements.

The gate lines 121 and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) or silicon oxide (SiOx) is formed on the gate lines 121 and the storage electrode lines 131.

A plurality of semiconductor islands 154 preferably made of hydrogenated amorphous silicon (abbreviated to "a-Si") or polysilicon are formed on the gate insulating layer 140. The semiconductor islands 154 are disposed on the gate electrodes 124 and include extensions covering edges of the gate lines 121. A plurality of other semiconductor islands (not shown) may be disposed on the storage electrode lines 131.

A plurality of ohmic contact islands 163 and 165 are formed on the semiconductor stripes 154. The ohmic contacts 163 and 165 are preferably made of n+ hydrogenated a-Si heavily doped with n type impurity such as phosphorous or they may be made of silicide. The ohmic contacts 163 and 165 are located in pairs on the semiconductor islands 154.

The lateral sides of the semiconductor islands 154 and the ohmic contacts 163 and 165 are inclined relative to the surface of the substrate 110, and the inclination angles thereof are preferably in a range of about 30-80 degrees.

A plurality of data lines 171 and a plurality of drain electrodes 175 are formed on the ohmic contacts 163 and 165 and the gate insulating layer 140.

The data lines 171 transmit data signals and extend substantially in the longitudinal direction to intersect the gate lines 121 and the storage electrode lines 131. Each data line 171 includes a plurality of source electrodes 173 projecting toward the gate electrodes 124 and an end portion 179 having a large area for contact with another layer or an external driving circuit A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

The drain electrodes 175 are separated from the data lines 171 and disposed opposite the source electrodes 173 with respect to the gate electrodes 124. Each drain electrode 175 includes a wide end portion 177 and a narrow end portion. The wide end portion 177 overlaps a storage electrode 137 of a storage electrode line 131 and the narrow end portion is partly enclosed by a source electrode 173 that is curved like a character U.

A gate electrode 124, a source electrode 173, and a drain electrode 175 along with a semiconductor island 154 form a TFT having a channel formed in the semiconductor island 154 disposed between the source electrode 173 and the drain electrode 175.

The data lines 171 and the drain electrodes 175 are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data lines 171 and the drain electrodes 175 may be made of various metals or conductors.

The data lines 171 and the drain electrodes 175 have inclined edge profiles, and the inclination angles thereof range about 30-80 degrees.

The ohmic contacts 163 and 165 are interposed only between the underlying semiconductor islands 154 and the overlying conductors 171 and 175 thereon and reduce the contact resistance therebetween. The extensions of the semiconductor islands 154 disposed on the edges of the gate lines 121 smooth the profile of the surface to prevent disconnection of the data lines 171 there. The semiconductor islands 154 include some exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor islands 154. The passivation layer 180 is preferably made of inorganic or organic insulator and it may have a flat surface. Examples of the inorganic insulator include silicon nitride and silicon oxide. The organic insulator may have photosensitivity and it preferably has dielectric constant less than about 4.0. The passivation layer 180 may include a lower film of inorganic insulator and an upper film of organic insulator such that it takes the excellent insulating characteristics of the organic insulator while preventing the exposed portions of the semiconductor islands 154 from being damaged by the organic insulator.

The passivation layer 180 has a plurality of contact holes 182 and 185 exposing the end portions 179 of the data lines 171 and the wide end portions 177 of the drain electrodes 175, respectively. The passivation layer 180 and the gate insulating layer 140 have a plurality of contact holes 181 exposing the end portions 129 of the gate lines 121. The contact holes 181, 182 and 185 may have inclined or stepped sidewalls that can be easily obtained by using organic material.

A plurality of pixel electrodes 190, a shielding electrode 88, and a plurality of contact assistants 81 and 82 are formed on the passivation layer 180. They are preferably made of transparent conductor such as ITO or IZO or reflective conductor such as Ag, Al, Cr, or alloys thereof.

The pixel electrodes 190 are physically and electrically connected to the drain electrodes 175 through the contact holes 185 such that the pixel electrodes 190 receive data voltages from the drain electrodes 175. The pixel electrodes 190 supplied with the data voltages generate electric fields in cooperation with a common electrode (not shown) of an opposing display panel (not shown) supplied with a common voltage, which determine the orientations of liquid crystal molecules (not shown) of a liquid crystal layer (not shown) disposed between the two electrodes. A pixel electrode 190 and the common electrode form a capacitor referred to as a "liquid crystal capacitor," which stores applied voltages after the TFT turns off.

A pixel electrode 190 overlaps a storage electrode 137 of a storage electrode line 131. The pixel electrode 190 and a drain electrode 175 connected thereto and the storage electrode 137 of the storage electrode line 131 form an additional capacitor referred to as a "storage capacitor," which enhances the voltage storing capacity of the liquid crystal capacitor.

Each pixel electrode 190 is approximately a rectangle having chamfered corners and the chamfered edges of the pixel electrode 190 make an angle of about 45 degrees with the gate lines 121. The pixel-electrodes 190 overlap the gate lines 121 to increase the aperture ratio.

Each pixel electrode 190 has center cutouts 91 and 92, lower cutouts 93a, 94a and 95a, and upper cutouts 93b, 94b and 95b, which partition the pixel electrode 190 into a plurality of partitions. The cutouts 91-95b substantially have an inversion symmetry with respect to a storage electrode line 131.

Each of the lower and the upper cutouts 93a-95b obliquely extends approximately from a left edge, a left corner, a lower edge, or an upper edge of the pixel electrode 190 approximately to a right edge of the pixel electrode 190. The lower cutouts 93a-95a and the upper cutouts 93b-95b are disposed at lower and upper halves of the pixel electrode 190, respectively, which can be divided by the storage electrode line 131. The lower and the upper cutouts 93a-95b make an angle of about 45 degrees to the gate lines 121, and they extend substantially perpendicular to each other.

The center cutout 91 extends along the storage electrode line 131 and has an inlet from the left edge of the pixel electrode 190, which has a pair of inclined edges substantially parallel to the lower cutouts 93a-95a and the upper cutout 93b-95b, respectively. The center cutout 92 includes a short transverse portion extending along the storage electrode line 131 and a pair of oblique portions obliquely extending from the transverse portion toward the left edge of the pixel electrode 190. The oblique portions make an angle of about 45 degrees with the gate lines 121.

Accordingly, the lower half of the pixel electrode 190 is partitioned into several lower partitions by the lower cutouts 93a-95a and the upper half of the pixel electrode 190 is also partitioned into two upper partitions by the upper cutouts 93b-95b. The number of partitions or the number of the cutouts is varied depending on the design factors such as the size of the pixel electrode 190, the ratio of the transverse edges and the longitudinal edges of the pixel electrode 190, the type and characteristics of the liquid crystal layer 3, and so on.

The shielding electrode 88 is supplied with the common voltage and it includes longitudinal portions extending along the data lines 171 and transverse portions extending along the gate lines 127.

The longitudinal portions fully cover the data lines 171 and have a plurality apertures 881 extending along the data lines 171. Each of the apertures 881 lies within the boundary of a data line 171 and it preferably has a longitudinal center line coinciding with that of the data line 171. Each of the apertures 881 is disposed between two adjacent gate lines 121.

The transverse portions connect adjacent longitudinal portions and each of the transverse portions lies within the boundary of a gate line 121.

The widths of the longitudinal portions and the transverse portions may be varied. For example, each of the longitudinal portions lies within the boundary of a data line 121, while the transverse portions fully cover the gate lines 121.

For receiving the common voltage, the shielding electrode 88 may be connected to the storage electrode lines 131 through contact holes (not shown) penetrating the gate insulating layer 140 and the passivation layer 180. Otherwise, the shielding electrode 88 may be connected to short points (not shown) where the common voltage is transmitted from the TFT array panel 100 to the common electrode panel 200.

The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171.

At this time, the apertures 881 reduce the parasitic capacitance between the data lines 171 and the shielding electrode 88, thereby decreasing the signal delay of the data voltages due to the shielding electrode 88.

Furthermore, since the pixel electrodes 190 are required to be spaced apart from the shielding electrodes 88 for preventing the short therebetween, the pixel electrodes 190 become farther from the data lines 171 such that the parasitic capacitance therebetween becomes reduced. Moreover, since the permittivity of the LC layer 3 is higher than that of the passivation layer 180, the parasitic capacitance between the data lines 171 and the shielding electrodes 88 is reduced compared with that between the data lines 171 and the common electrode 270 without the shielding electrodes 88.

In addition, the distance between the pixel electrodes 190 and the shielding electrodes 88 can be uniformly maintained since they are made of the same layer and thus the parasitic capacitance therebetween can be made uniform.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIGS. 2-5.

A light blocking member 220 referred to as a black matrix for preventing light leakage is formed on an insulating substrate 210 such as transparent glass or plastic. The light blocking member 220 include a plurality of rectilinear portion facing the data lines 171 on the TFT array panel 100 and a plurality of widened portions facing the TFTs on the TFT array panel 100. Otherwise, the light blocking member 220 may have a plurality of openings that face the pixel electrodes 190, and it may have substantially the same planar shape as the pixel electrodes 190.

A plurality of color filters 230 are also formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 is formed on the color filters 230 and the light blocking member 220. The overcoat 250 is preferably made of (organic) insulator and it prevents the color filters 230 from being exposed and provides a flat surface A common electrode 270 is formed on the overcoat 250. The common electrode 270 is preferably made of transparent conductive material such as ITO and IZO and has a plurality of sets of cutouts 71, 72, 73a, 73b, 74a, 74b, 75a and 75b.

A set of cutouts 71-75b face a pixel electrode 190 and include center cutouts 71 and 72, lower cutout 73a, 74a and 75a and upper cutouts 73b, 74b and 75b. Each of the cutouts 71-75b is disposed between adjacent cutouts 91-95b of the pixel electrode 190 or between a cutout 95a or 95b and a chamfered edge of the pixel electrode 190. In addition, each of the cutouts 71-75b has at least an oblique portion having a depressed notch and extending parallel to the lower cutout 93a-95a or the upper cutout 93b-95b of the pixel electrode 190. The cutouts 71-75b have substantially an inversion symmetry with respect to a storage electrode line 131.

Each of the lower and the upper cutouts 73a-75b includes an oblique portion and a pair of transverse and longitudinal portions or a pair of longitudinal portions. The oblique portion extends approximately from a left edge, a left corner, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71 and 72 includes a central transverse portion, a pair of oblique portions, and a pair of terminal longitudinal portions. The central transverse portion extends approximately from a center or the right edge of the pixel electrode 190 along the storage electrode line 131. The oblique portions extend from an end of the central transverse portion approximately to the left edge of the pixel electrode and making oblique angles with the central transverse portion. The terminal longitudinal portions extend from the ends of the respective oblique portions along the left edge of the pixel electrode 190, overlapping the left edge of the pixel electrode 190, and making obtuse angles with the respective oblique portions.

The number of the cutouts 71-75b may be also varied depending on the design factors, and the light blocking member 220 may overlap the cutouts 71-75b to block the light leakage through the cutouts 71-75b.

Alignment layers 11 and 21 that may be homeotropic are coated on inner surfaces of the panels 100 and 200, and polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The retardation film has birefringence and gives a retardation opposite to that given by the LC layer 3.

The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules in the LC layer 3 are aligned such that their long axes are substantially vertical to the surfaces of the panels 100 and 200 in the absence of electric field. Accordingly, incident light cannot pass the crossed polarization system 12 and 22.

Upon application of the common voltage to the common electrode 270 and a data voltage to a pixel electrode 190, an electric field substantially perpendicular to the surfaces of the panels 100 and 200 is generated and both the pixel electrode 190 and the common electrode 190 are commonly referred to as "field generating electrodes" hereinafter. The LC molecules tend to change their orientations in response to the electric field such that their long axes are perpendicular to the field direction The cutouts 91-95b and 71-75b control the tilt directions of the LC molecules in the LC layer 3. This will be described in detail.

The cutouts 91-95b and 71-75b of the field generating electrodes 190 and 270 and the oblique edges of the pixel electrodes 190 distort the electric field to have a horizontal component that is substantially perpendicular to the edges of the cutouts 91-95b and 71-75b and the oblique edges of the pixel electrodes 190. Accordingly, the LC molecules tend to tilt in a direction determined by the horizontal component.

Referring to FIG. 3, a set of the cutouts 91-95b and 71-75b divides a pixel electrode 190 into a plurality of sub-areas and each sub-area has two major edges. Since the LC molecules on each sub-area tilt perpendicular to the major edges, the azimuthal distribution of the tilt directions are localized to four directions, thereby increasing the reference viewing angle of the LCD.

The notches in the cutouts 71-75b determine the tilt directions of the LC molecules on the cutouts 71-75b and they may be provided at the cutouts 91-95b and may have various shapes and arrangements.

In the meantime, since there is no electric field between the shielding electrode 88 and the common electrode 270, the LC molecules on the shielding electrode 88 remain their initial orientations and thus the light incident thereon is blocked. Accordingly, the shielding electrode 88 may serve as a light blocking member.

The shapes and the arrangements of the cutouts 91-95b and 71-75b may be modified.

At least one of the cutouts 91-95b and 71-75b can be substituted with protrusions (not shown) or depressions (not shown). The protrusions are preferably made of organic or inorganic material and disposed on or under the field-generating electrodes 190 or 270.

An LCD according to another embodiment of the present invention will be described in detail with reference to FIGS. 6 and 7.

Figure 6:
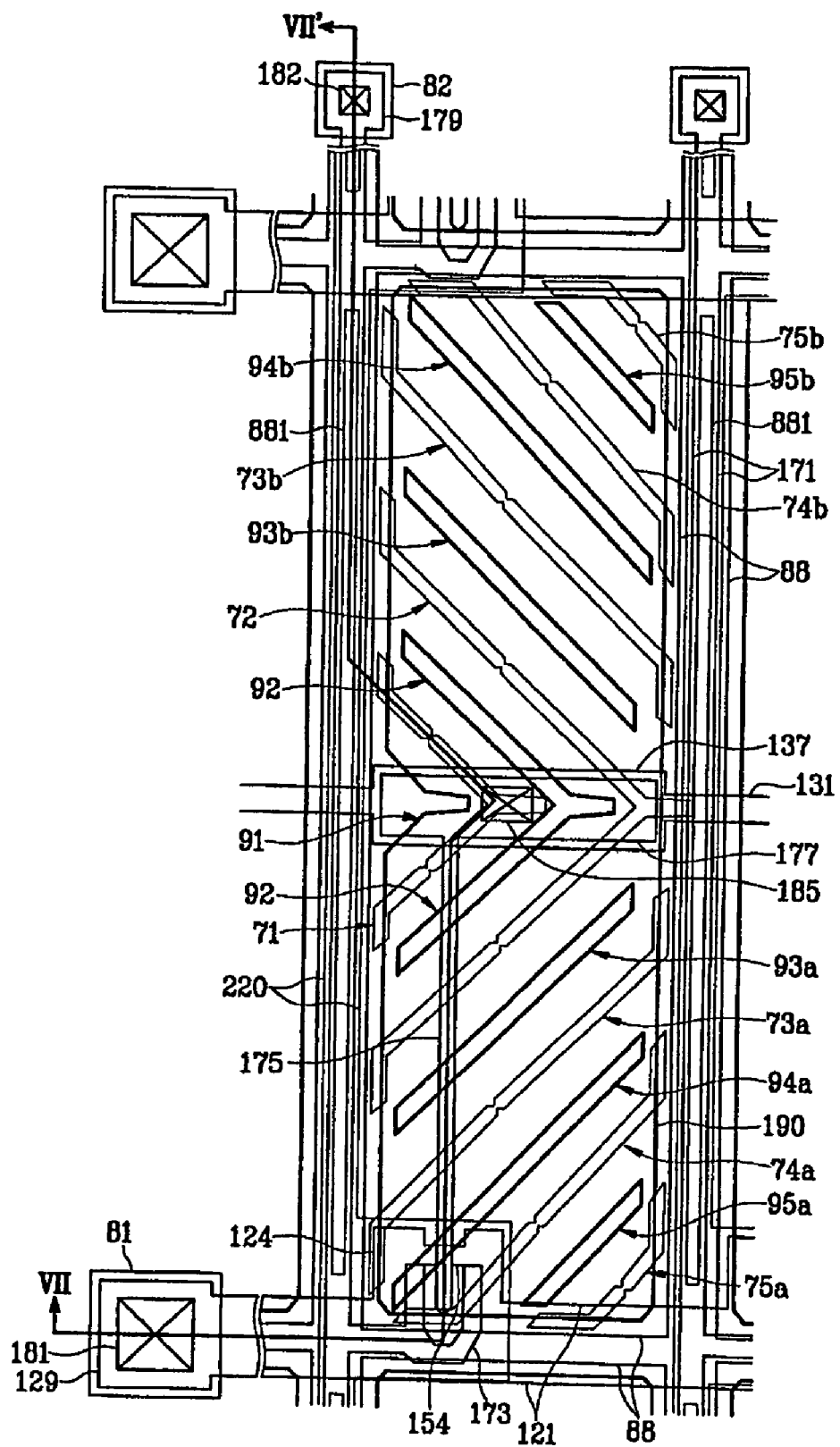
FIG. 6 is a layout view of an LCD according to another embodiment of the present invention.
Figure 7:
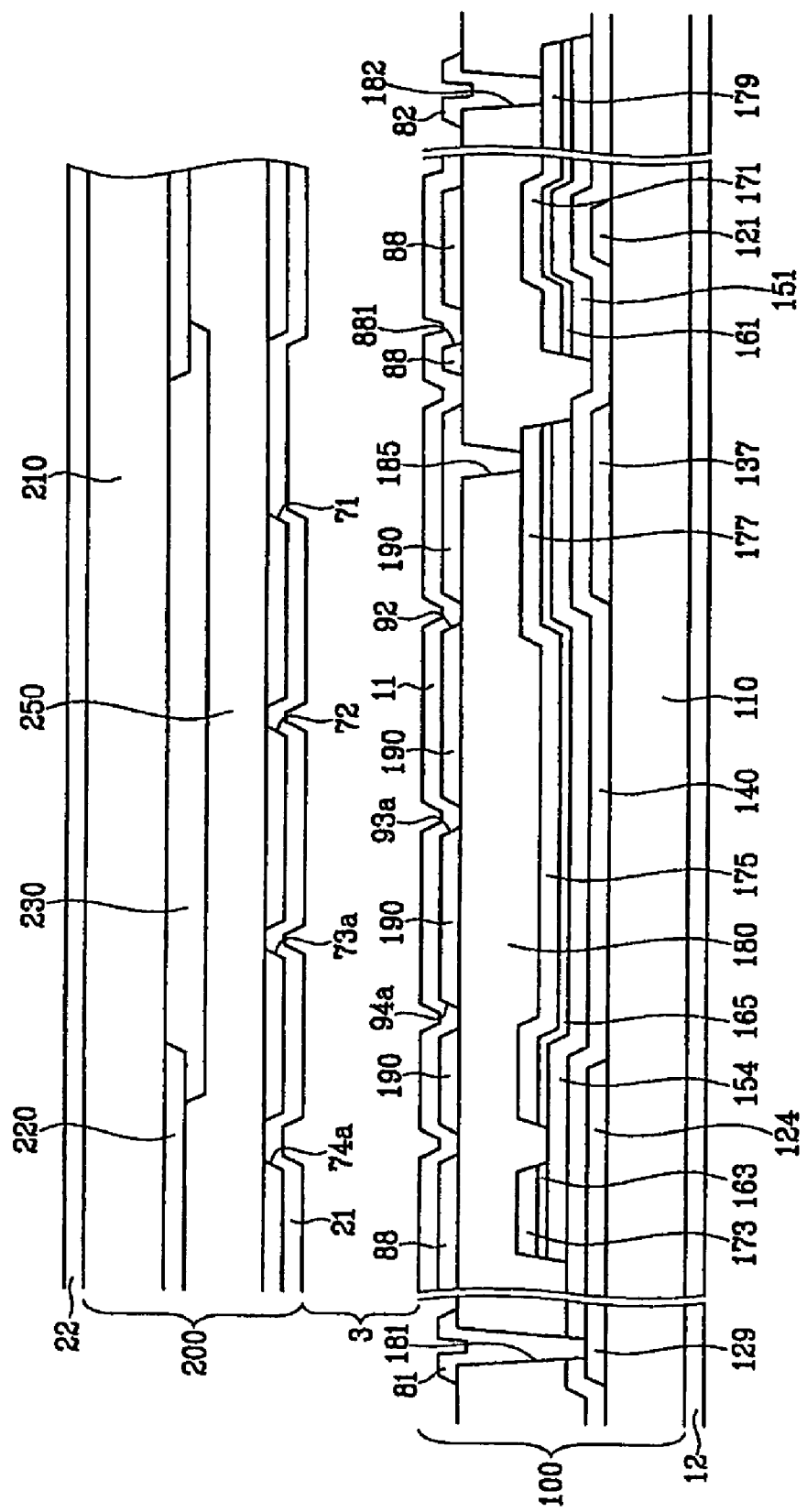
FIG. 7 is a sectional view of the LCD shown in FIG. 6 taken along line VII-VII'.

FIG. 6 is a layout view of an LCD according to another embodiment of the present invention, and FIG. 7 is a sectional view of the LCD shown in FIG. 6 taken along line VII-VII'.

Referring to FIGS. 6 and 7, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and end portions 129 and a plurality of storage electrode lines 131 including storage electrodes 137 are formed on a substrate 110, and a gate insulating layer 140, a plurality of semiconductors 154, and a plurality of ohmic contacts 163 and 165 are sequentially formed thereon. A plurality of data lines 171 including source electrodes 173 and end portions 179, and a plurality of drain electrodes 175 including expansions 177 are formed on the ohmic contacts 163 and 165, and a passivation layer 180 is formed thereon. A plurality of contact holes 181, 182 and 185 are provided at the passivation layer 180 and the gate insulating layer 140. A plurality of pixel electrodes 190 having a plurality of cutouts 91-95b, a shielding electrode 88 having a plurality of apertures 881, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having a plurality of cutouts 71-75b, and an alignment layer 21 are formed on an insulating substrate 210.

Different from the LCD shown in FIGS. 1-5, the semiconductors 154 and the ohmic contacts 163 of the TFT array panel 100 according to this embodiment extend along the data lines 171 to form semiconductor stripes 151 and ohmic contact stripes 161. In addition, the semiconductors 154 have almost the same planar shapes as the data lines 171 and the drain electrodes 175 as well as the underlying ohmic contacts 163 and 165. However, the semiconductors 154 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171 and the drain electrodes 175, the semiconductors 151, and the ohmic contacts 161 and 165 using one photolithography step.

A photoresist masking pattern for the photolithography process has position-dependent thickness, and in particular, it has first and second portions with decreased thickness. The first portions are located on wire areas that will be occupied by the data lines 171, the drain electrodes 175, and the metal pieces 172 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-5 may be appropriate to the LCD shown in FIGS. 6 and 7.

An LCD according to another embodiment of the present invention will be described in detail with reference to FIGS. 8, 9 and 10.

Figure 8:
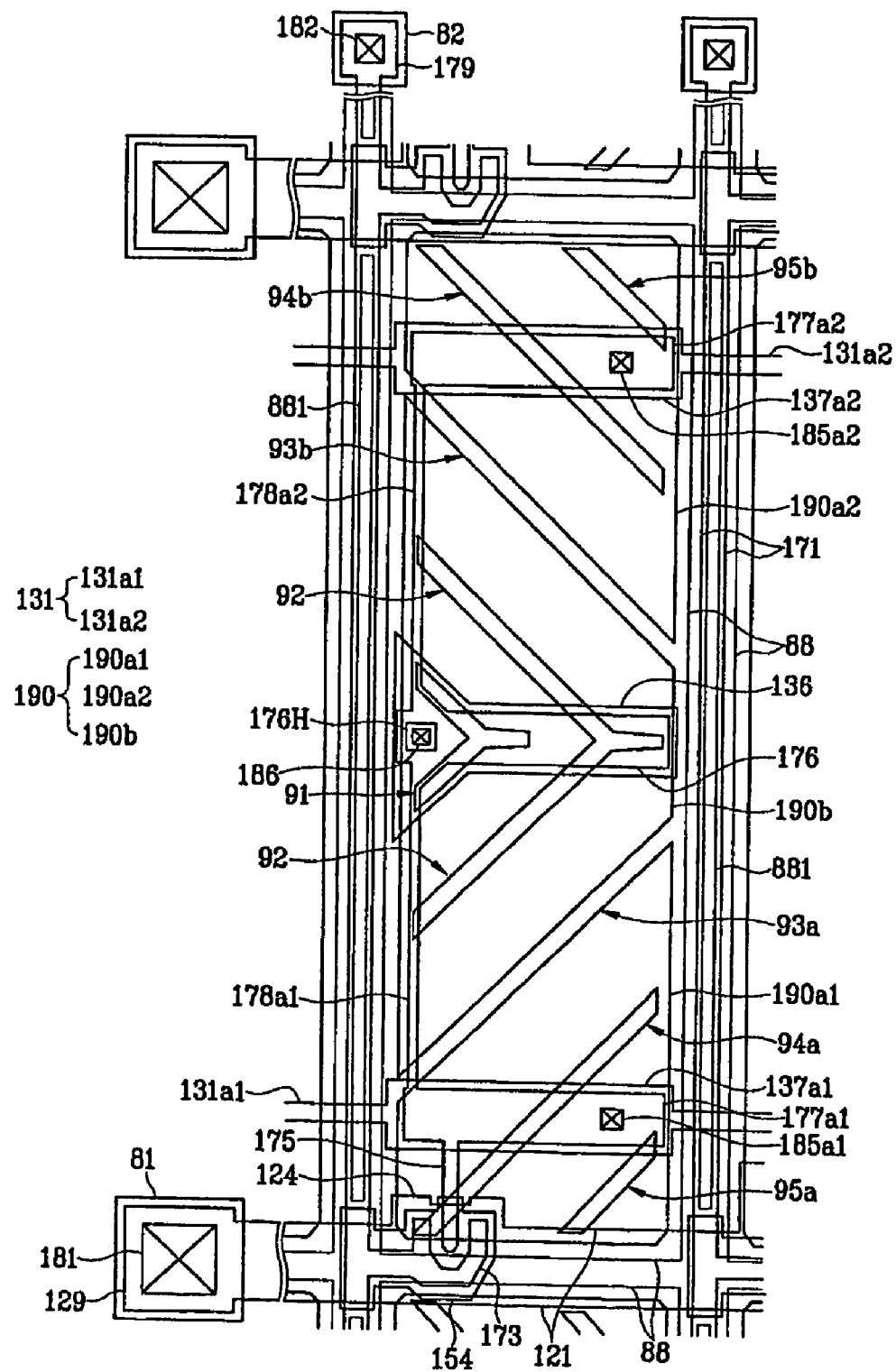
FIG. 8 is a layout view of an LCD according to another embodiment of the present invention.
Figure 9:
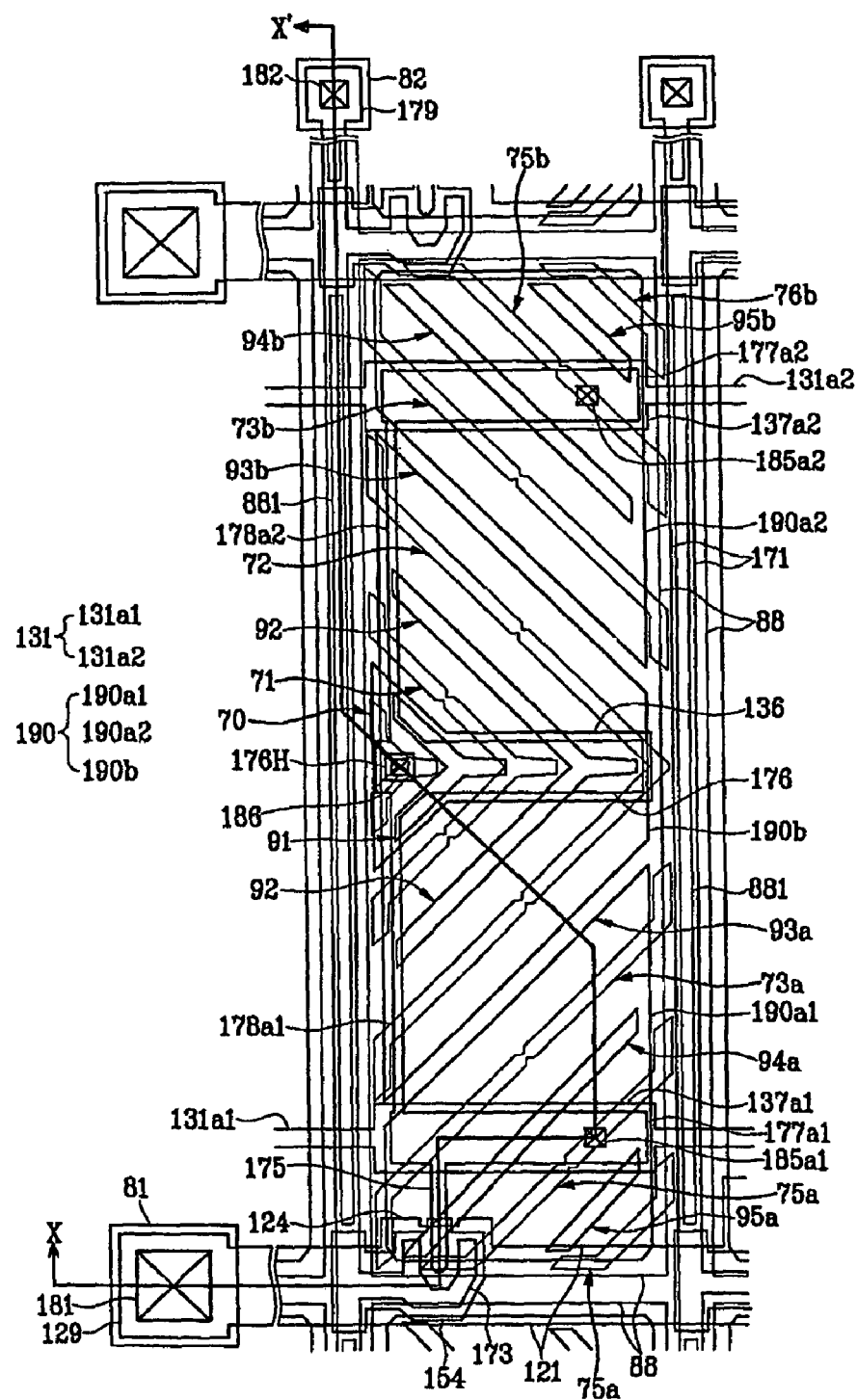
FIG. 9 is a layout view of an LCD including the TFT array panel shown in FIG. 8 and the common electrode panel shown in FIG. 2.
Figure 10:
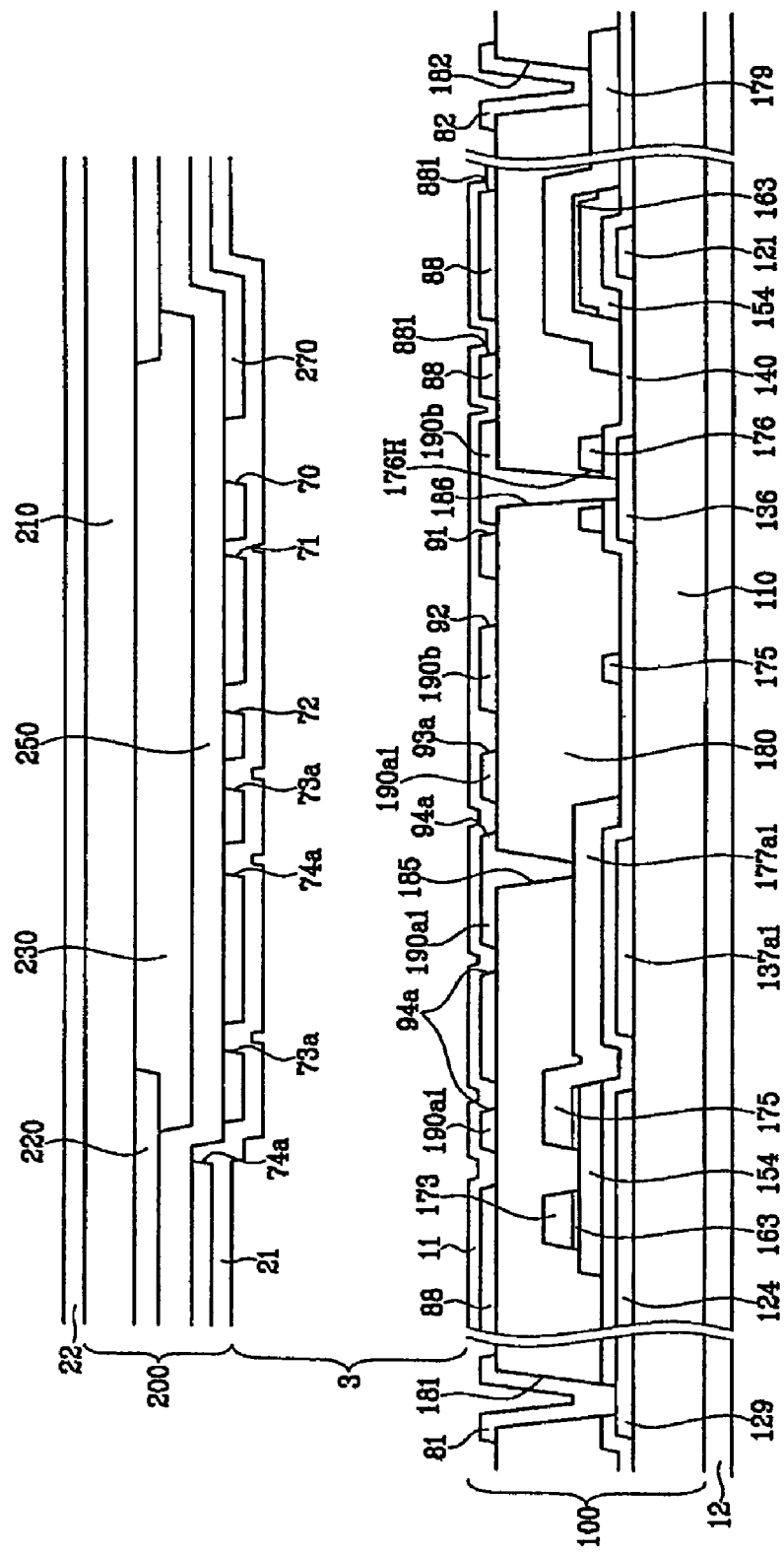
FIG. 10 is a sectional view of the LCD shown in FIG. 9 taken along line X-X'.

FIG. 8 is a layout view of a TFT array panel for an LCD according to another embodiment of the present invention, FIG. 9 is a layout view of an LCD including the TFT array panel shown in FIG. 8 and the common electrode panel shown in FIG. 2, and FIG. 10 is a sectional view of the LCD shown in FIG. 9 taken along line X-X'.

Referring to FIGS. 8-10, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor islands 154, and a plurality of ohmic contacts 163 and 165 are sequentially formed thereon. A plurality of data lines 171 including source electrodes 173 and end portions 179, and a plurality of drain electrodes 175 are formed on the ohmic contacts 163 and 165 and the gate insulating layer 140, and a passivation layer 180 is formed thereon. A plurality of contact holes 181, 182, 185a1 and 185a2 are provided at the passivation layer 180 and the gate insulating layer 140. A plurality of pixel electrodes 190 having a plurality of cutouts 91-95b, a shielding electrode 88 having a plurality of apertures 881, and a plurality of contact assistants 81 and 82 are formed on the passivation layer 180, and an alignment layer 11 is coated thereon.

Regarding the common electrode panel 200, a light blocking member 220, an overcoat 250, a common electrode 270 including a plurality of cutouts 70-75b, and an alignment layer 21 are formed on an insulating substrate 210.

Different from the LCD shown in FIGS. 1-5, each of the storage electrode lines 131 includes a pair of lower and upper stems 131a1 and 131a2 disposed close to lower and upper one of two adjacent gate lines 121, respectively. The lower and the upper stems 131a1 and 131a2 include lower and upper storage electrodes 137a1 and 137a2, respectively.

Furthermore, a plurality of capacitive electrodes 136 is formed on the substrate 110. The capacitive electrodes 136 are made of the same layer as the gate lines 121 and separated from the gate lines 121 and the storage electrode lines 131. Each of the capacitive electrodes 136 is disposed between a pair of lower and upper storage electrodes 137a1 and 137a2 and it is substantially equidistant from the lower and the upper storage electrodes 137a1 and 137a2 and from adjacent two gate lines 121. Each of the capacitive electrodes 136 is a rectangle elongated parallel to the gate lines 121 and it includes a funneled left end portion, which has oblique edges making about 45 degrees with the gate lines 121 and overlaps a center cutout 91 of a pixel electrode 190.

The gate insulating layer 140 and the passivation layer 180 has a plurality of contact holes 186 exposing the funneled end portions of the capacitive electrodes 136.

Each of the drain electrodes 175 include lower, upper, and central expansions 177a1, 177a2, and 176, a pair of interconnections 178a1 and 178a2 connecting the expansions 177a1, 177a2, and 176, and a narrow end portion. Each of the expansions 177a1, 177a2, and 176 are a rectangle elongated parallel to the gate lines 121 and the interconnections 178a1 and 178a2 connect the expansions 177a1, 177a2, and 176 near left sides thereof.

The lower and upper expansions 177a1 and 177a2 overlap lower and upper storage electrodes 137a1 and 137a2, respectively, to form a storage capacitor.

The central expansion 176 overlaps a capacitive electrode 136 to form a coupling capacitor and referred to as a "coupling electrode." The coupling electrode 176 has nearly the same shape as the capacitive electrode 136 and has a through-hole 176H near a funneled left end portion, through which a contact hole 186 passes without exposing the coupling electrode 176.

Each of the pixel electrodes 190 is divided into lower, upper, and central sub-pixel electrodes 190a1, 190a2 and 190b by lower and upper cutouts 93a and 93b, that is, the lower and the upper cutouts 93a and 93b completely penetrate the pixel electrode 190 in an oblique manner from a left edge to a right edge. Accordingly, the central sub-pixel electrode 190b is an isosceles trapezoid rotated by a right angle and the lower and the upper sub-pixel electrodes 190a1 and 190a2 are right-angled trapezoids rotated by a right angle.

The lower and the upper sub-pixel electrodes 190a1 and 190a2 are connected to the lower and the upper expansions 177a1 and 177a2 of the drain electrodes 175 through contact holes 185a1 and 185a2, respectively.

The central sub-pixel electrode 190b is connected to a capacitive electrode 136 through a contact hole 186 and overlaps a coupling electrode 176. The central sub-pixel electrode 190b, the capacitive electrode 136, and the coupling electrode 176 form a "coupling capacitor."

The central sub-pixel electrode 190b has central cutouts 91 and 92, the lower sub-pixel electrode 190a1 has lower cutouts 94a and 95a, and the upper sub-pixel electrode 190a2 has upper cutouts 94b and 95b.

The central cutout 91 of the central sub-pixel electrode 190b is located within the central sub-pixel electrode 190b and it includes a transverse portion and a pair of oblique portions connected thereto. The oblique portions of the central cutout 91 are also parallel to the lower or the upper cutouts 94a and 95a or 94b and 95b.

The left edge is projected out near a contact hole 186 such that the central sub-pixel electrode 190b is connected to a capacitive electrode 136 through the contact hole 186. Since the contact between the central sub-pixel electrode 190b and the capacitive electrode 136 is formed by penetrating the coupling electrode 176, there is no need to prepare an additional area only for the contact. In addition, a relatively small contact area is required as compared with a case providing the additional contact area since the coupling electrode 176 surrounding the contact hole 186 can block the light leakage caused by the smooth profile of the contact hole 186, particularly for a thick organic passivation layer 180.

In addition, a set of cutouts 70-75b of the common electrode 270 shown in FIG. 9 has one more central cutout 70 disposed near the contact holes 186. The central cutout 70 also includes a central transverse portion, a pair of oblique portions, and a pair of terminal longitudinal portions. However, the center cutout 72 has no central transverse portion.

The opaque members such as the storage electrode lines 131, the capacitive electrodes 136, and the expansions 177a1, 177a2 and 176 and the interconnections 178a1 and 178a2 of the drain electrodes 175, and the transparent members such as the pixel electrodes 190 having the cutouts 91-95b and 71-76b are symmetrically arranged with respect to the capacitive electrodes 136 that are equidistant from adjacent gate lines 121.

In this configuration, the central sub-pixel electrode 190b is capacitively coupled to the lower and the upper sub-pixel electrodes 190a1 and 190a2 through the capacitive electrode 136 and the coupling electrode 176, which will be described in detail with reference FIG. 11.

Figure 11:
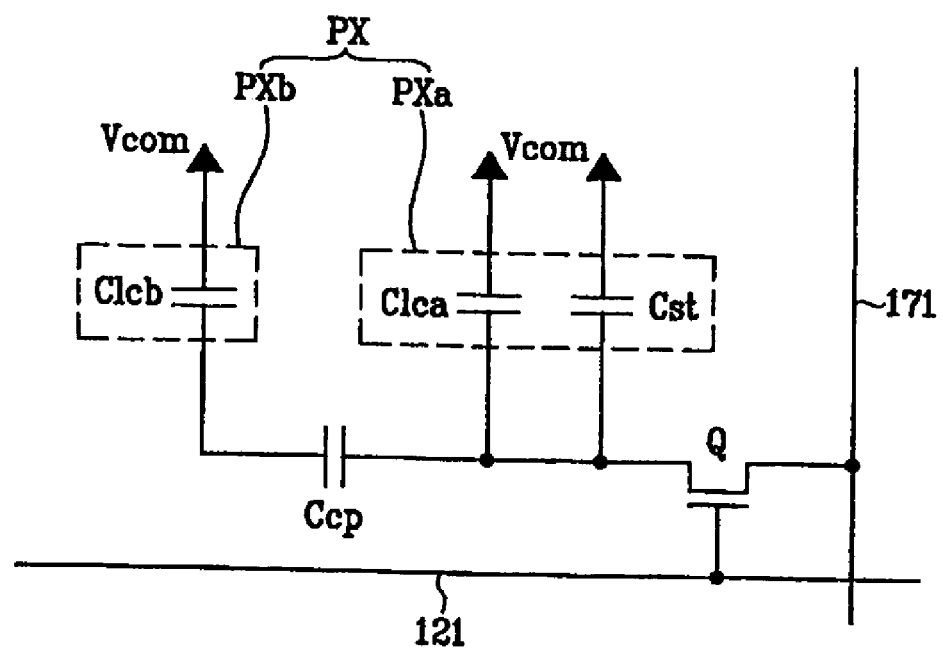
FIG. 11 is an equivalent circuit diagram of the LCD shown in FIGS. 8-10.

FIG. 11 is an equivalent circuit diagram of the LCD shown in FIGS. 8-10.

Referring to FIG. 11, a pixel PX of the LCD includes a TFT Q, a first subpixel PXa including a first LC capacitor Clca and a storage capacitor Cst, a second subpixel PXb including a second LC capacitor Clcb, and a coupling capacitor Ccp.

The first LC capacitor Clca includes lower and upper sub-pixel electrodes 190a1 and 190a2 as one terminal, a portion of the common electrode 270 corresponding thereto as the other terminal, and a portion of the LC layer 3 disposed therebetween as a dielectric. Similarly, the second LC capacitor acb includes a central subpixel electrode 190b as one terminal, a portion of the common electrode 270 corresponding thereto as the other terminal, and a portion of the LC layer 3 disposed thereon as a dielectric.

The storage capacitor Cst includes lower and upper expansions 177a1 and 177a2 of a drain electrode 175 as one terminal, lower and upper storage electrodes 137a1 and 137a2 as the other terminal, and a portion of the gate insulating layer 140 disposed therebetween as a dielectric. The coupling capacitor Ccp includes a central sub-pixel electrode 190b and a capacitive electrode 136 as one terminal, a coupling electrode 176 as the other terminal, and portions of the passivation layer 180 and the gate insulating layer 140 disposed therebetween as a dielectric.

The first LC capacitor Clca and the storage capacitor Cst are connected in parallel to a drain of the TFT Q. The coupling capacitor Ccp is connected between the drain of the TFT Q and the second LC capacitor Clcb. The common electrode 270 is supplied with a common voltage Vcom and the storage electrode lines 131 may be supplied with the common voltage Vcom.

The TFT Q applies data voltages from a data line 171 to the first LC capacitor Clca and the coupling capacitor Ccp in response to a gate signal from a gate line 121, and the coupling capacitor Ccp transmits the data voltage with a modified magnitude to the second LC capacitor Clcb.

If the storage electrode line 131 is supplied with the common voltage Vcom and each of the capacitors Clca, Cst, Clcb and Ccp and the capacitance thereof are denoted as the same reference characters, the voltage Vb charged across the second LC capacitor Clcb is given by:

$$Vb = Va \times [Ccp/(Ccp+Clcb)],$$

where Va denotes the voltage of the first LC capacitor Clca.

Since the term Ccp/(Ccp+Clcb) is smaller than one, the voltage Vb of the second LC capacitor Clcb is greater than that of the first LC capacitor Clca. This inequality may be also true for a case that the voltage of the storage electrode line 131 is not equal to the common voltage Vcom.

Accordingly, the strength of the electric field in the second LC capacitor Clcb is always weaker than that in the first LC capacitor Clca, and thus the LC molecules in the first and the second LC capacitors Clca and Clcb tilt at different angles to cause different light transmittances. Accordingly, while maintaining the average luminance of the two subpixels PXa and PXb in a target luminance, the voltages Va and Vb of the first and the second subpixels PXa and PXb can be adjusted so that an image viewed from a lateral side is the closest to an image viewed from the front, thereby improving the lateral visibility.

The ratio of the voltages Va and Vb can be adjusted by varying the capacitance of the coupling capacitor Ccp, and the coupling capacitance Ccp can be varied by changing the overlapping area and distance between the coupling electrode 176 and the central sub-pixel electrode 190b (and the capacitive electrode 136). For example, the distance between the coupling electrode 176 and the central sub-pixel electrode 190b becomes large when the capacitive electrode 136 is removed and the coupling electrode 176 is moved to the position of the capacitive electrode 136. Preferably, the voltage Vb of the second LC capacitor Clcb is from about 0.6 to about 0.8 times the voltage Va of the first LC capacitor Clca.

The voltage Vb charged in the second LC capacitor Clcb may be larger than the voltage Va of the first LC capacitor Clca. This can be realized by precharging the second LC capacitor Clcb with a predetermined voltage such as the common voltage Vcom.

The ratio of the lower and the upper sub-pixel electrodes 190a1 and 190a2 of the first subpixel PXa and the central sub-pixel electrode 190b of the second subpixel PXb is preferably from about 1:0.85 to about 1:1.15 and the number of the sub-pixel electrodes in each of the LC capacitors Clca and Clcb may be changed.

Many of the above-described features of the LCD shown in FIGS. 1-5 may be appropriate to the LCD shown in FIGS. 8-11.

An LCD according to another embodiment of the present invention will be described in detail with reference to FIGS. 12 and 13.

Figure 12:
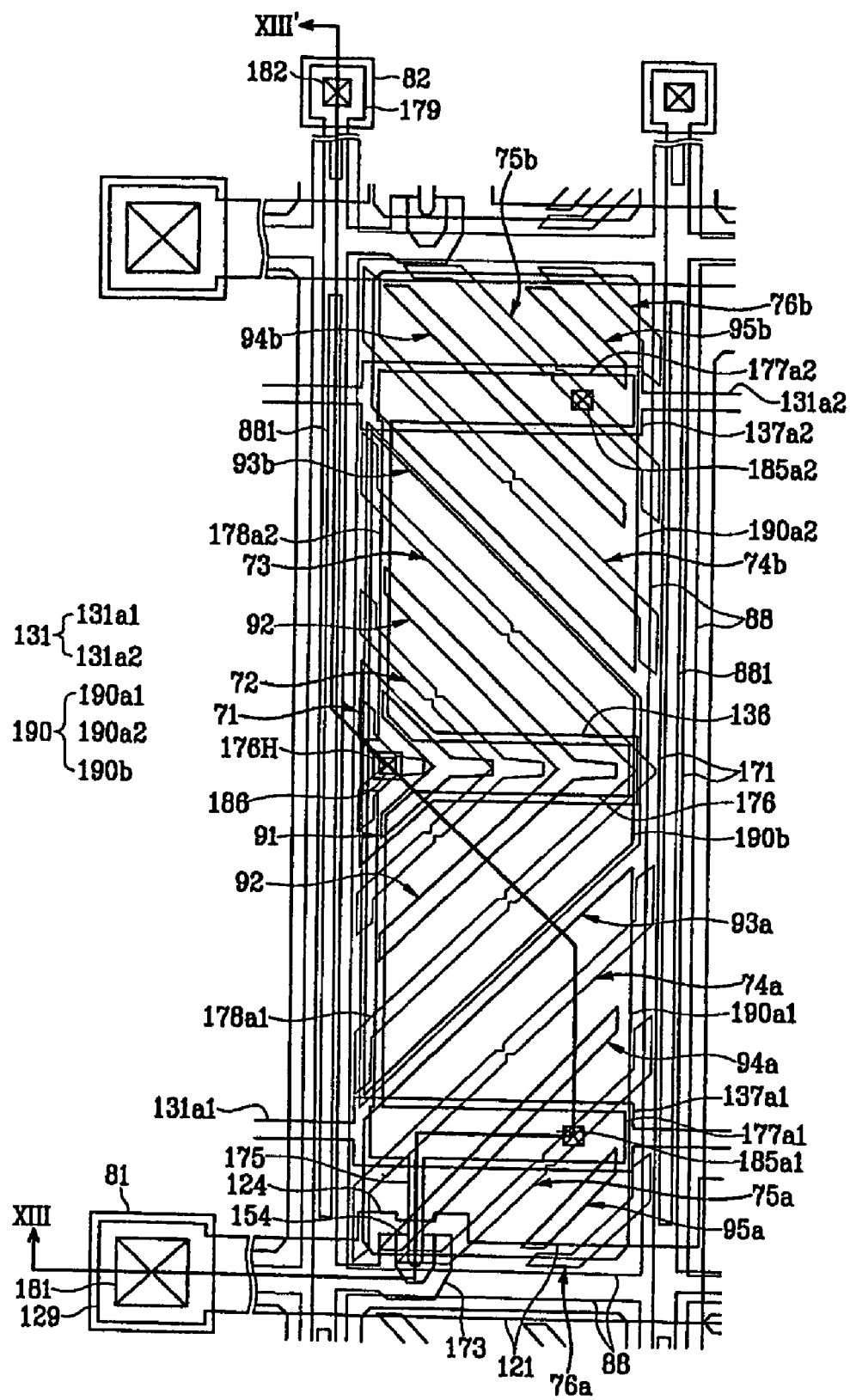
FIG. 12 is a layout view of an LCD according to another embodiment of the present invention.
Figure 13:
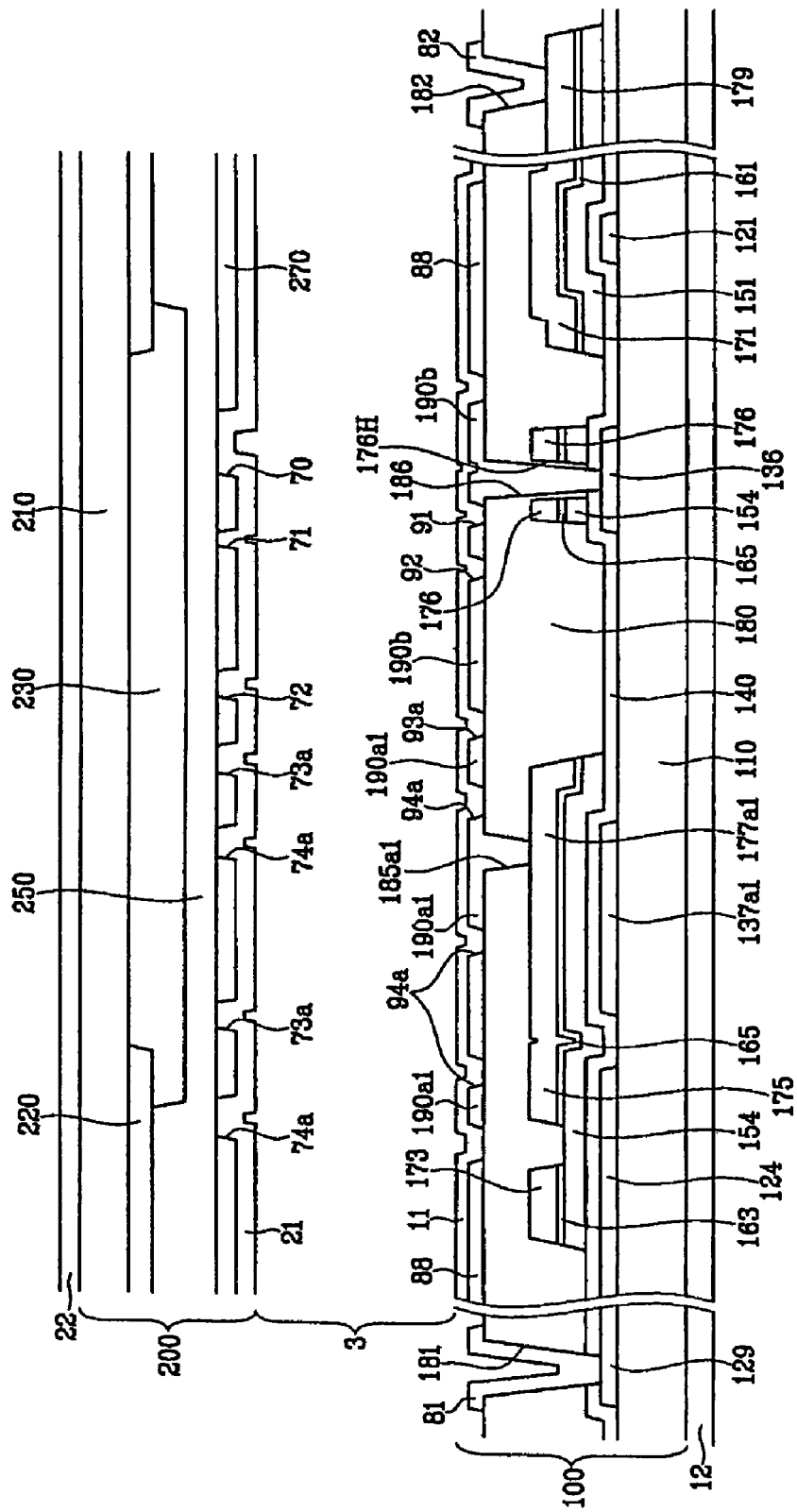
FIG. 13 is a sectional view of the LCD shown in FIG. 12 taken along line XIII-XIII'.

FIG. 12 is a layout view of an LCD according to another embodiment of the present invention, and FIG. 13 is a sectional view of the LCD shown in FIG. 12 taken along line XIII-XIII'.

Referring to FIGS. 12 and 13, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 8-10.

Regarding the TFT array panel 100, a plurality of gate lines 121 including gate electrodes 124 and end portions 129, a plurality of storage electrode lines 131 including stems 131a1 and 131a2 with storage electrodes 137a1 and 137a2, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including expansions 177a1, 177a2 and 176 and interconnections 178a1 and 178a2 are formed on the ohmic contacts 163 and 165. A passivation layer 180 is formed on the data lines 171, the drain electrodes 175, and exposed portions of the semiconductors 154. A plurality of contact holes 181, 182, 185a1, 185a2 and 186 are provided at the passivation layer 180 and the gate insulating layer 140 and the contact holes 186 pass through through-holes 176H provided at the expansions 176 of the drain electrodes 175. A plurality of pixel electrodes 190 including subpixel electrodes 190a1, 190a2 and 190b and having cutouts 91-95b, a shielding electrode 88 having apertures 881, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 71-75b, and an alignment layer 21 are formed on an insulating substrate 210.

Different from the LCD shown in FIGS. 8-10, the semiconductors 154 and the ohmic contacts 163 of the TFT array panel 100 according to this embodiment extend along the data lines 171 to form semiconductor stripes 151 and ohmic contact stripes 161. In addition, the semiconductor stripes 154 have almost the same planar shapes as the data lines 171 and the drain electrodes 175 as well as the underlying ohmic contacts 163 and 165. However, the semiconductors 154 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171 and the drain electrodes 175, the semiconductors 151, and the ohmic contacts 161 and 165 using one photolithography step, thereby simplifying the manufacturing process.

Many of the above-described features of the LCD shown in FIGS. 8-10 may be appropriate to the LCD shown in FIGS. 12 and 13.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
an insulating substrate;
a gate line formed on the insulating substrate and having a gate electrode;
a gate insulating layer covering the gate line;
a semiconductor layer formed on the gate insulating layer over the gate electrode;
a data line intersecting the gate line and having a source electrode;
a drain electrode facing the source electrode with respect to the semiconductor layer;
a passivation layer covering the semiconductor layer, the data line and the drain electrode, and having a contact hole;
a pixel electrode formed on the passivation layer and connecting to the drain electrode through the contact hole; and
a shielding electrode disposed on the passivation layer and having a first part covering the gate line and a second part covering the data line,
wherein the second part of the shielding electrode has at least one aperture, the at least one aperture being disposed within the boundaries of the shielding electrode, and
wherein the shielding electrode is made of a transparent conductive material.

2. The thin film transistor array panel of claim 1, wherein the aperture is formed over the data line and has a width narrower than the width of the data line.

3. The thin film transistor array panel of claim 1, wherein the aperture is formed along a center line of the data line.

4. The thin film transistor array panel of claim 3, wherein the shielding electrode covers edges of the data line.

5. The thin film transistor array panel of claim 1, wherein the width of the first part is narrower than the width of the gate line.

6. The thin film transistor array panel of claim 1, wherein the first part and the second part of the shielding electrode intersect over the place where the gate line and the data line intersect.

7. The thin film transistor array panel of claim 1, wherein the pixel electrode has a first domain defining member formed in an upper region of the pixel electrode, and a second domain defining member formed in a lower region of the pixel electrode.

8. The thin film transistor array panel of claim 7, wherein the first domain defining member extends in a first direction and the second domain defining member extends in a second direction.

9. The thin film transistor array panel of claim 8, wherein an angle between the first direction and the second direction is about 90 degrees.

10. The thin film transistor array panel of claim 8, wherein one of the first direction and the second direction has an angle of about 45 degrees with respect to the gate line and the data line.

11. The thin film transistor array panel of claim 1, wherein the source electrode encompasses at least a part of the drain electrode.

12. The thin film transistor array panel of claim 1, wherein the passivation layer comprises an organic insulator.

13. The thin film transistor array panel of claim 1, further comprising a storage electrode overlapping the pixel electrode.

14. The thin film transistor array panel of claim 13, wherein the shielding electrode and the storage electrode are supplied with substantially the same voltage.

* * * * *